(12) United States Patent
Tschache

(10) Patent No.: US 10,027,490 B2
(45) Date of Patent: Jul. 17, 2018

(54) METHOD FOR REVOKING A GROUP OF CERTIFICATES

(71) Applicant: Robert Bosch GmbH, Stuttgart (DE)

(72) Inventor: Alexander Tschache, Wolfsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 170 days.

(21) Appl. No.: 14/638,473

(22) Filed: Mar. 4, 2015

(65) Prior Publication Data

US 2015/0256348 A1    Sep. 10, 2015

(30) Foreign Application Priority Data

Mar. 5, 2014  (DE) .................. 10 2014 204 044

(51) Int. Cl.
*H04L 9/32* (2006.01)
*H04L 9/30* (2006.01)

(52) U.S. Cl.
CPC .......... *H04L 9/3268* (2013.01); *H04L 9/3066* (2013.01)

(58) Field of Classification Search
None
See application file for complete search history.

(56) References Cited

U.S. PATENT DOCUMENTS

| | | | | |
|---|---|---|---|---|
| 6,397,329 B1* | 5/2002 | Aiello | ................... | H04L 9/3265 713/155 |
| 6,487,658 B1* | 11/2002 | Micali | ................... | G06Q 20/02 713/158 |
| 2001/0032310 A1* | 10/2001 | Corella | ................... | H04L 9/002 713/156 |
| 2003/0123656 A1* | 7/2003 | Izu | ................... | G06F 7/725 380/30 |
| 2003/0236976 A1* | 12/2003 | Wheeler | ................... | H04L 63/0823 713/158 |
| 2004/0111607 A1* | 6/2004 | Yellepeddy | ................... | H04L 9/3255 713/155 |
| 2005/0141706 A1* | 6/2005 | Regli | ................... | H04L 9/0836 380/44 |
| 2005/0257046 A1* | 11/2005 | Durand | ................... | H04L 9/3268 713/158 |
| 2006/0106836 A1* | 5/2006 | Masugi | ................... | G06F 21/33 |

(Continued)

FOREIGN PATENT DOCUMENTS

| | | | |
|---|---|---|---|
| CN | 101151839 | * | 5/2012 |
| WO | WO2007096858 | * | 8/2007 |

OTHER PUBLICATIONS

Haas et al., Design and Analysis of a Lightweight Certificate Revocation Mechanism for VANET, VANET '09, ACM978-1-60558-737-0/09/09.*

(Continued)

*Primary Examiner* — Peter Poltorak
(74) *Attorney, Agent, or Firm* — Norton Rose Fulbright US LLP; Gerard Messina

(57) ABSTRACT

A method is described for revoking a group of certificates, each of which includes a key, for an authenticated communication between one first subscriber and at least one second subscriber, one first key and one revocation value, with the aid of which the keys of the group of certificates may be calculated from the first key, being transmitted for the purpose of revocation to the at least one second subscriber.

23 Claims, 4 Drawing Sheets

(56) References Cited

U.S. PATENT DOCUMENTS

| | | | | |
|---|---|---|---|---|
| 2006/0168357 A1* | 7/2006 | Nakano | G11B 20/00086 | 710/5 |
| 2007/0186237 A1* | 8/2007 | Takatori | H04N 7/162 | 725/32 |
| 2013/0031363 A1* | 1/2013 | Wnuk | H04L 63/0823 | 713/158 |
| 2014/0289512 A1* | 9/2014 | Tseng | H04L 9/3268 | 713/158 |
| 2014/0310515 A1* | 10/2014 | Kim | H04L 9/321 | 713/155 |

OTHER PUBLICATIONS

Amoozadeh, "Certificate Revocation List Distribution in Vehicular Communication Systems", Master's Degree Project, Sweden, XR-EE-LCN 2012:014 Nov. 2012.*

2 Documents of Stubing, "Multilayered Security and Privacy Protection in Car-to-X Networks", DOI 10.1007/978-3-65802531-1_3 Springer 2013.*

Feghhi et al., Digital Certificates Applied Internet Security, 1999, ISBN: 0201309807.*

Pietrowicz et al, Short-Lived, Unlinked Certificateds for Privacy-Preserving Secure Vehicular Communications, 17$^{th}$ ITS World Congress Conference, Paper SP30-1, 2010.*

Whyte et al., "A Security Credential Management System for V2V Communications", 2013 IEEE Vehicularl Networking Conference, 978-1-4799-2687-9/13.*

Haas et al. Efficient Certificate Revocation List Organization and Distribution, IEEE Journal on Selected Areas in Communications, Vo. 29, No. 3, Mar. 2011.*

Li et al., "A Scalable Scheme for Certificate Revocation", Proceeding of the Fourth International Conference on Machine Learning and Cybernetics, Guagzhou, Aug. 2005.*

* cited by examiner

US 10,027,490 B2

METHOD FOR REVOKING A GROUP OF CERTIFICATES

FIELD OF THE INVENTION

The present invention relates to a method for revoking a group of certificates, each of which includes a key, the certificates being provided for an authenticated communication.

BACKGROUND INFORMATION

Modern vehicles are intended to be able to communicate with one another, as a result of which, for example, potential traffic accidents are intended to be avoided, since a vehicle then notices, without the assistance of the driver, for example, when another vehicle is approaching. Such a communication is referred to as car-to-car communication or, in short, C2C-communication. An extension thereof is also the communication of vehicles with other subscribers, for example, with traffic infrastructure. Such a communication is then generally referred to as C2X communication.

In connection with this C2C and C2X communication, messages sent out by vehicles are signed, in order to prevent manipulation and falsification. However, such signing makes a vehicle potentially traceable, since the certificates used for signing would be clearly associated with one vehicle.

The common C2X standards (CAMP in the U.S., ETSI in Europe) minimize this problem in that a vehicle receives a large set (up to approximately 2000) of certificates or pseudonym-certificates, from which it may choose. These certificates are not to be linked to one another. Thus, if the vehicle changes its active certificate, its newly signed messages cannot be correlated with its previous messages, and it becomes considerably more difficult to trace.

If each vehicle receives such a set or also a group of certificates, it becomes difficult to impossible to revoke these, if necessary, i.e., to declare them invalid, since each certificate would have to be revoked individually. This would generate significant amounts of data, in particular, in the case of C2X communication.

The CAMP standard solves this problem by introducing a so-called "linkage value" into each certificate generated with the aid of the Butterfly Key method. These "linkage values" are essentially hash chains, via which a set of certificates is linked. They are based on a secret key, which is different for each set of certificates. In the event a set of certificates is to be revoked, this key is published and each C2X subscriber may recalculate the resulting hash chain or the "linkage values." If such a "linkage value" is found in a certificate, the certificate is considered revoked or invalid.

Thus, a revocation becomes possible, since the key of only one certificate set must be published. Not every certificate need be individually revoked. However, the "linkage value" must be stored in each certificate, which increases significantly the volume of data of the C2X communication, since each C2X message also contains the corresponding certificate.

The ETSI C2X model presently specifies no revocation for pseudonym certificates.

It is therefore desirable to provide an efficient revocation of groups of certificates and, at the same time, a smaller amount of data during the communication.

SUMMARY

According to the present invention, a method is described. Advantageous embodiments are shown in the following description.

A method according to the present invention is used for revoking a group or a set of certificates, each of which includes a (public) key (keys not further identified are hereinafter public keys). A key in a certificate makes an authenticated communication possible between a first subscriber, for example, a vehicle, and at least one second subscriber, for example, other vehicles and/or additional road users and/or networked traffic infrastructure. The second subscribers behave identically with respect to the method according to the present invention, which is why it is sufficient to describe one second subscriber. A group of certificates in this case may include a large number of certificates, for example, approximately 2000, each with its own key. For each (public) key of an exemplary communication, a private key is also generated, which is used by the first subscriber for signing a message. This private key is preferably known only to the first subscriber. With the (public) key, which is distributed in the certificates and is known to the second subscriber, it is possible to verify the signature.

To revoke the group of certificates, a first key of all the keys encompassed by the certificates of the group, and a revocation value for a calculation rule, with the aid of which the remaining keys of all the keys encompassed by the certificates of the group may be calculated from the first key using the calculation rule, are transmitted for the purpose of revocation to the at least one second subscriber. This enables the second subscriber to calculate the remaining keys of the group of all keys encompassed by the certificates of the group with the aid of the revocation value from the first key, using the calculation rule, and in the future to recognize certificates, which include this key, as revoked. In the same way, the first subscriber may also be informed of the revocation, so that in the future, it no longer uses certificates which include one of these keys.

The first key is, in particular, a public key, which is generated with the aid of elliptic curve cryptography (ECC). In the process, an associated private key, in particular, is also generated. The remaining (public) keys may be derived from this as so-called butterfly keys, for which purpose the private key need not be known. Additional private keys associated with the remaining keys may, in particular, also be generated only from the private key. Additionally, the keys thus generated are also not to be linked to one another.

If the first key and the revocation value, which may be, in particular, a so-called seed, from which the remaining keys may be calculated using a deterministic random number generator and, if necessary, an associated calculation rule, are transmitted to the at least one second subscriber, the at least one second subscriber may itself calculate all of the keys, the associated certificates of which are to be revoked or declared invalid. It is not necessary to transmit all of the keys. In addition, only one key each must be imbedded in a certificate, which is necessary regardless for a secure and authenticated communication. Additional data need not be included in the certificate, as a result of which a method according to the present invention is applicable for many different certificate formats, in which ECC may be used and, at the same time, an amount of data to be transmitted with each message may be kept low.

The first key is generated preferably by the first subscriber, since in this manner, a private key required for generating the first key is known only to the first subscriber, and thus, only the first subscriber may also sign.

The first key and the revocation value are advantageously transmitted from an intermediary to the at least one second subscriber. The intermediary is in particular a certification body. The intermediary may therefore decide whether and when it revokes certificates. In this case, it is also not detrimental that the at least one second subscriber may establish a link of the certificate to be revoked to the first subscriber, since these certificates are already no longer used.

It is advantageous if the first key and a generator value, with the aid of which the remaining keys of the group may be calculated from the first key, are transmitted beforehand by the first subscriber to the intermediary, in order to have the group of keys signed by the intermediary. The intermediary may calculate all of the keys of the group with the aid of the generator value from the first key using the calculation rule, and then sign these in the usual manner, in particular with an intermediary certificate. In this way, not all keys of the certificates of the group need be transmitted to the at least one intermediary for signing, rather, the intermediary may itself calculate the remaining keys to be signed from the first key. In this way, the required amount of data to be transmitted is significantly reduced.

The remaining keys and, optionally, the first key are advantageously signed by the at least one intermediary for the authenticated communication and, prior to revocation, are transmitted to the first subscriber in associated certificates. In this way, the first subscriber receives a group of certificates each with one key, from which the at least one second subscriber knows that another subscriber using this key is authenticated. However, the at least one second subscriber is not aware that this group of certificates originates from the first subscriber. If the first subscriber now uses different certificates, the at least one second subscriber cannot know that these different certificates are all being used by the same first subscriber. A traceability of the first subscriber is therefore ruled out, or at least made considerably more difficult. The first key may be used for communication; advantageously, however, it is not used for communication, but rather only for generating the other keys.

The revocation value is used to define the keys to be revoked; the generator value is used to define the key to be signed beforehand. The revocation value may include the generator value and, in particular, may also be identical to it. Thus, all certificates that have been signed may be revoked.

Alternatively, at least one additional key may be calculated with the aid of the generator value from the first key, which is not calculable with the aid of the revocation value. In other words, as a result, more keys may be calculated, signed and corresponding associated certificates transmitted by the intermediary to the first subscriber, than are later revoked. This makes it possible, for example, when correspondingly selecting the generator values and revocation values, to declare invalid only those keys or certificates which have not yet been used by the first subscriber. In this case, it is possible with the aid of the revocation value to calculate using the deterministic random number generator only a portion of the remaining keys, in particular only forward, but not back from a predetermined value. Thus, the at least one second subscriber is unable to establish any link between the certificates or keys used previously by the first subscriber and, thus, to the first subscriber itself. A subsequent traceability is therefore prevented or at least made considerably more difficult. A corresponding selection of the revocation value must then, if necessary, be first transmitted by the first subscriber to the intermediary, since only the first subscriber knows which certificate it has already used. Alternatively, the intermediary may also equip the certificates with different periods of validity or validity points according to the calculation sequence. The revocation value is then advantageously determined, based on the certificates still valid on the revocation date, so that specifically these certificates may then be declared invalid. This solution is therefore independent of any contribution of the first subscriber, and requires, in particular, no notification of previously used certificates.

It is advantageous if, in order to revoke an additional group of certificates, the first key and one additional revocation value are transmitted by one additional intermediary to the at least one second subscriber. This allows the first subscriber to have certificates signed by different intermediaries, but for this purpose, only one first key (and therefore also only one associated private key) need be generated. Thus, the same first keys, but different generator values, may be transmitted by the first subscriber to various intermediaries. However, the intermediaries themselves may revoke individual certificates. Thus, if more than one intermediary is used for signing, the calculation of the remaining keys from the first key may be divided among these multiple intermediaries. This ensures that even the individual intermediaries do not know all of the certificates of the first subscriber, but in each case only the one signed by them. This ensures enhanced protection against traceability.

A method according to the present invention may be applied not only to certificates in connection with the aforementioned C2X communication, but for many other scenarios, in which a group having a large number of certificates is used, in particular, also for customary X.509 certificates.

A processor unit according to the present invention, for example, a communication unit of a motor vehicle is, in particular, programmed to carry out a method according to the present invention.

The implementation of the method in the form of software is also advantageous, since it entails particularly low costs, in particular, if a performing control device is also used for additional tasks and is therefore already available. Suitable data media for providing the computer program are, in particular, diskettes, hard disks, flash memories, EEPROMs, CD-ROMs, DVDs and the like. It is also possible to download a program from computer networks (Internet, Intranet etc.).

Additional advantages and embodiments of the present invention result from the description and the appended drawing.

It is understood that the features cited above and those to be explained below are applicable not only in each specified combination, but also in other combinations or alone, without departing from the scope of the present invention.

The present invention is schematically represented based on exemplary embodiments in the drawing, and is described in detail below with reference to the drawing.

DETAILED DESCRIPTION

The figures depict preferred specific embodiments of the present invention, the revocation according to the present invention being depicted in each case in the bottom section below a dashed line. Depicted above the dashed line is, in addition, the optional certificate generation.

Figure 1:
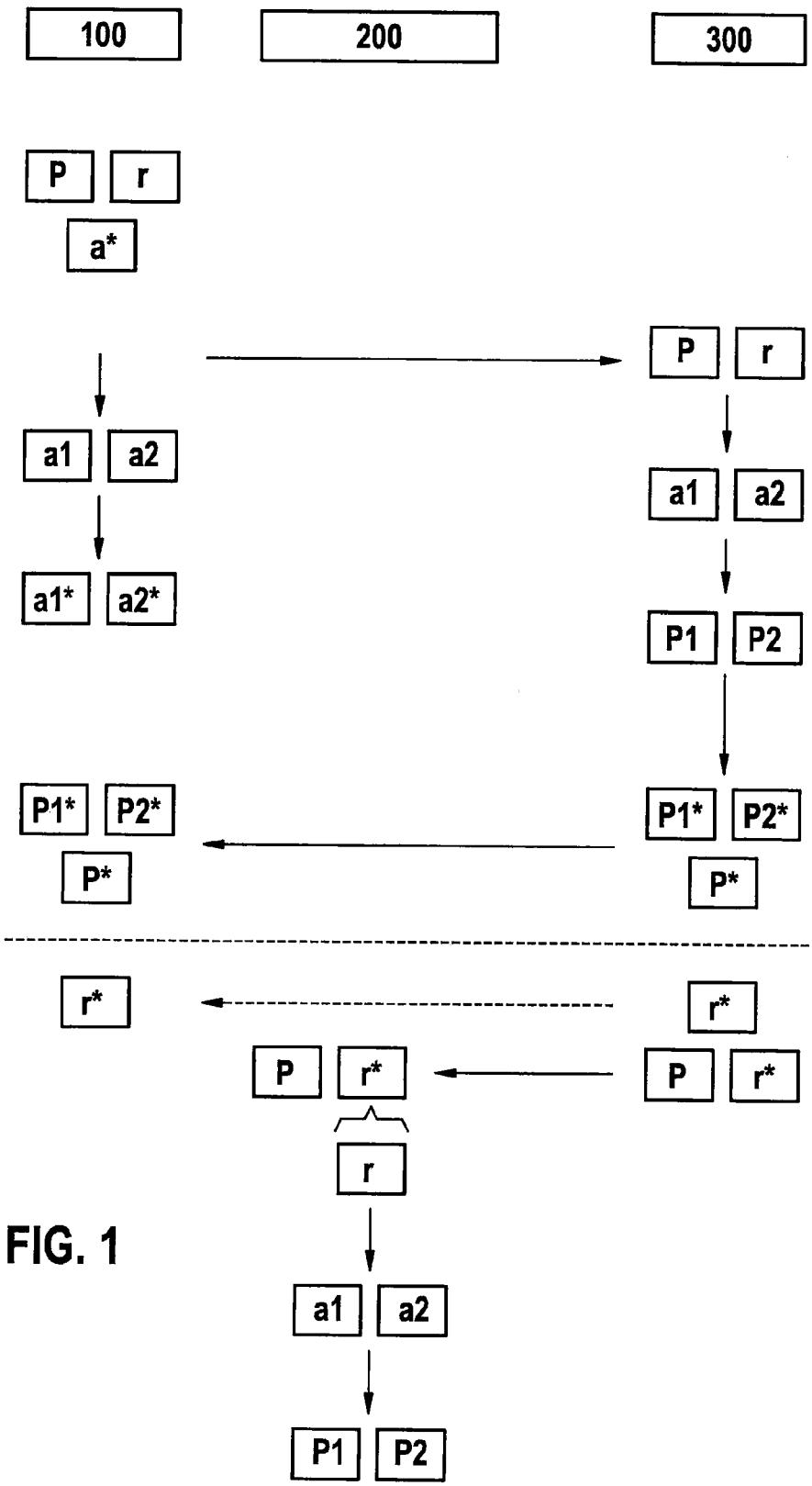
FIG. 1 schematically shows one preferred embodiment of a method according to the present invention.

FIG. 1 schematically shows one preferred embodiment of a method according to the present invention. The timing sequence is indicated from top to bottom. Involved in the method are one first subscriber 100, one second subscriber 200 and one intermediary 300. First subscriber 100 may be, for example, a vehicle participating in road traffic.

First subscriber 100 initially generates a key pair, including a private key a* and an associated public key as first key P. This takes place according to the so-called elliptical curve cryptography, in short, ECC. If in this case G is a (for example, publicly known) generator of an elliptical curve, then a public key P is generated according to the rule $P=a^* \times G$, × being the multiplication defined on the elliptical curve, and a* being a scalar. Scalar a*, which may be freely selected, is then used as a private key.

Thus, first key P may be generated from the freely selected private key a* according to the rule $P=a^* \times G$. First subscriber 100 also generates a generator value r. In one potential simple embodiment, this is a so-called seed, i.e., a numerical value, from which additional scalars may be generated with the aid of a suitable deterministic random number generator.

First subscriber 100 then transmits first key P and generator value r to an intermediary 300. Intermediary 300 is normally a certification authority. Intermediary 300 then calculates remaining keys P1, P2 from first key P and generator value r.

With ECC, it is possible in general to generate a different public key P' according to the rule $P'=a' \times G$, with a' as a scalar different from a*. In addition, the two aforementioned rules yield $(a^*+a') \times G = a^* \times G + a' \times G = P + P' = P''$, whereby P'' may also be a public key. This means that P'' is derived from P according to $P''=P+a' \times G$. These formulas are preferably encompassed by a calculation rule preferred within the scope of the present invention. The random number generator is also preferably encompassed by the calculation rule.

From this, it follows that remaining keys P1, P2 may be generated from first key P, only additional scalars a1, a2 being necessary, but not the original scalar or private key a*. Since intermediary 300 is able to generate these necessary scalars a1, a2 from the second start value r, it is also able to generate remaining keys P1, P2.

Intermediary 300 then forms certificates P*, P1*, P2* from keys P, P1, P2, signs the certificates with a unique intermediary key and then transmits them to first subscriber 100. Thus, first subscriber 100 possesses all of certificates P*, P1*, P2*. Each associated private key a1* and a2* may be calculated by first subscriber 100 based on the foregoing rule from $a1^*=a^*+a1$ and $a2^*=a^*+a2$. First subscriber 100 may now use the private keys and certificates for communication, for example, with a second subscriber 200. However, second subscriber 200 does not know that keys P, P1, P2 and the corresponding certificates P*, P1*, P2* belong together, rather only that another, in the present case, the first, subscriber, which possesses and uses it, is authenticated and certified. This effectively prevents a traceability of the first subscriber or at least makes it considerably more difficult. As a variation from the specific embodiment described herein, it may be provided that first key P is not used for a certificate P*, at least not for communication with the second subscriber.

If intermediary 300 seeks to revoke or declare the group of certificates P*, P1*, P2* invalid, which altogether includes keys P, P1, P2, then it generates a revocation value r* and transmits this, together with first key P, to second subscriber 200. Revocation value r* may be, in particular, the generator value r, if all certificates, i.e., all keys P, P1, P2, are to be revoked regardless. Preferably, the first subscriber is also informed of the revocation, so that in the future it no longer uses the revoked certificates. This may also occur by transferring revocation value r*, as is indicated in the figure by the dashed arrow.

Second subscriber 200 may now, analogously to the aforementioned operation, calculate remaining keys P1, P2 from first key P, and thereby mark all keys P, P1, P2 and the groups of certificates P*, P1*, P2* formed thereby as invalid. In this case, it is no longer relevant that second subscriber 200 is able to associate keys P1, P1, P2 collectively with first subscriber 100, since these are already no longer used. On the other hand, however, only first key P and revocation value r* need be transmitted by intermediary 300 to second subscriber 200. Since, in reality, approximately 2000 keys are used, for example, the amount of data to be transmitted during revocation is reduced significantly as compared to an individual revocation of each key.

Moreover, only one, or the, key in each case need be imbedded in a certificate (which is already necessary in the case of a certificate) and not, as in the related art, other additional data such as, for example, a linkage value. This reduces the amount of data to be transmitted during the communication. The only precondition of the key is ECC as the basis for generation.

Figure 2:
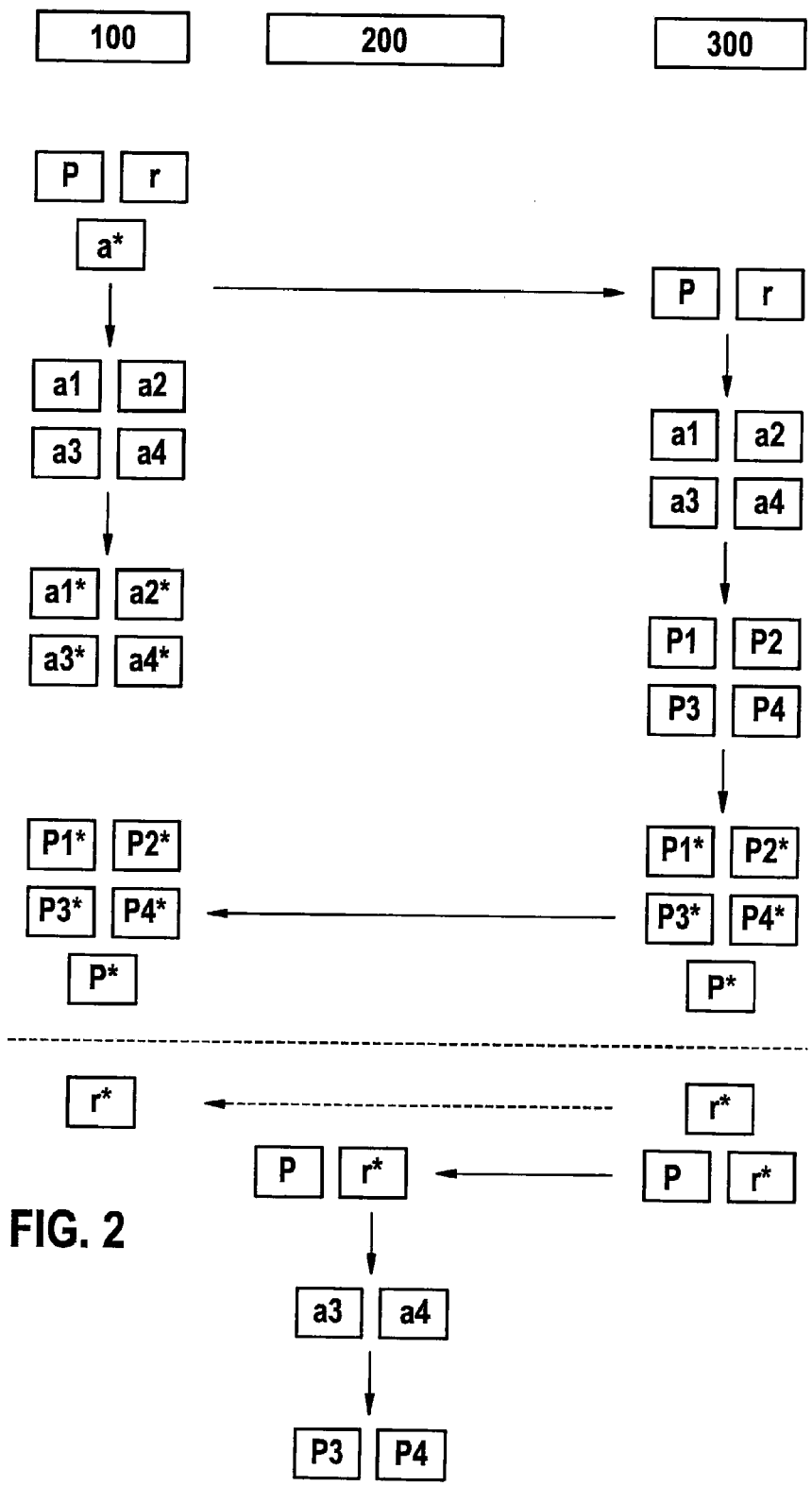
FIG. 2 schematically shows another preferred embodiment of a method according to the present invention.

FIG. 2 schematically shows another preferred embodiment of a method according to the present invention. The timing sequence is indicated from top to bottom. Involved in the method are one first subscriber 100, one second subscriber 200 and an intermediary 300. The method corresponds essentially to the method shown in FIG. 1, but with the difference that more keys may be calculated with generator value r than with revocation value r*.

Intermediary 300 is able to calculate keys P1, P2, P3, P4 from first key P transmitted to it by first subscriber 100 and generator value r. In addition, intermediary 300 also transmits all keys in the form of signed certificates P*, P1*, P2*, P3*, P4* to first subscriber 100. In this way, an authenticated communication between first subscriber 100 and second subscriber 200 is possible with the aid of keys P, P1, P2, P3, P4 and the certificates including these keys, and the associated private keys a*, a1*, a2*, . . . .

For the purpose of revocation, intermediary 300 again transmits revocation value r* and first key P to second subscriber 200, with the aid of which, however, second subscriber 200 is able only to calculate keys P3, P4. Thus, second subscriber 200 is only able to mark keys P, P3, P4 as invalid, but not keys P1, P2.

Revocation value r* may include, for example, a suitable value of a deterministic random number generator, with the aid of which only predetermined scalars may be calculated. Thus, only predetermined keys may also be calculated.

Preferably, the first subscriber is also informed of the revocation, so that in the future it no longer uses the revoked certificates. This may also occur by transferring revocation value r*, as is indicated in the figure by the dashed arrow.

In this way, it is possible for intermediary 300 to revoke only certain intended certificates. For example, it may be that the first subscriber by now has already used the certificates with keys P1, P2, not, however, those with keys P3, P4. Since second subscriber 200 is now unable, however, to relate keys P1, P2 to first subscriber 100, a subsequent retraceability is no longer possible. Keys P3, P4 on the other hand are already no longer used.

A method according to the present invention may also be used if the first subscriber seeks to have its certificates signed by two or multiple different intermediaries. For this purpose, the certificates may simply be divided into two or more groups. In particular, different intermediaries may be designed as different calculation systems by only one certification authority. This is exemplarily shown in FIGS. 3 and 4.

Figure 3:
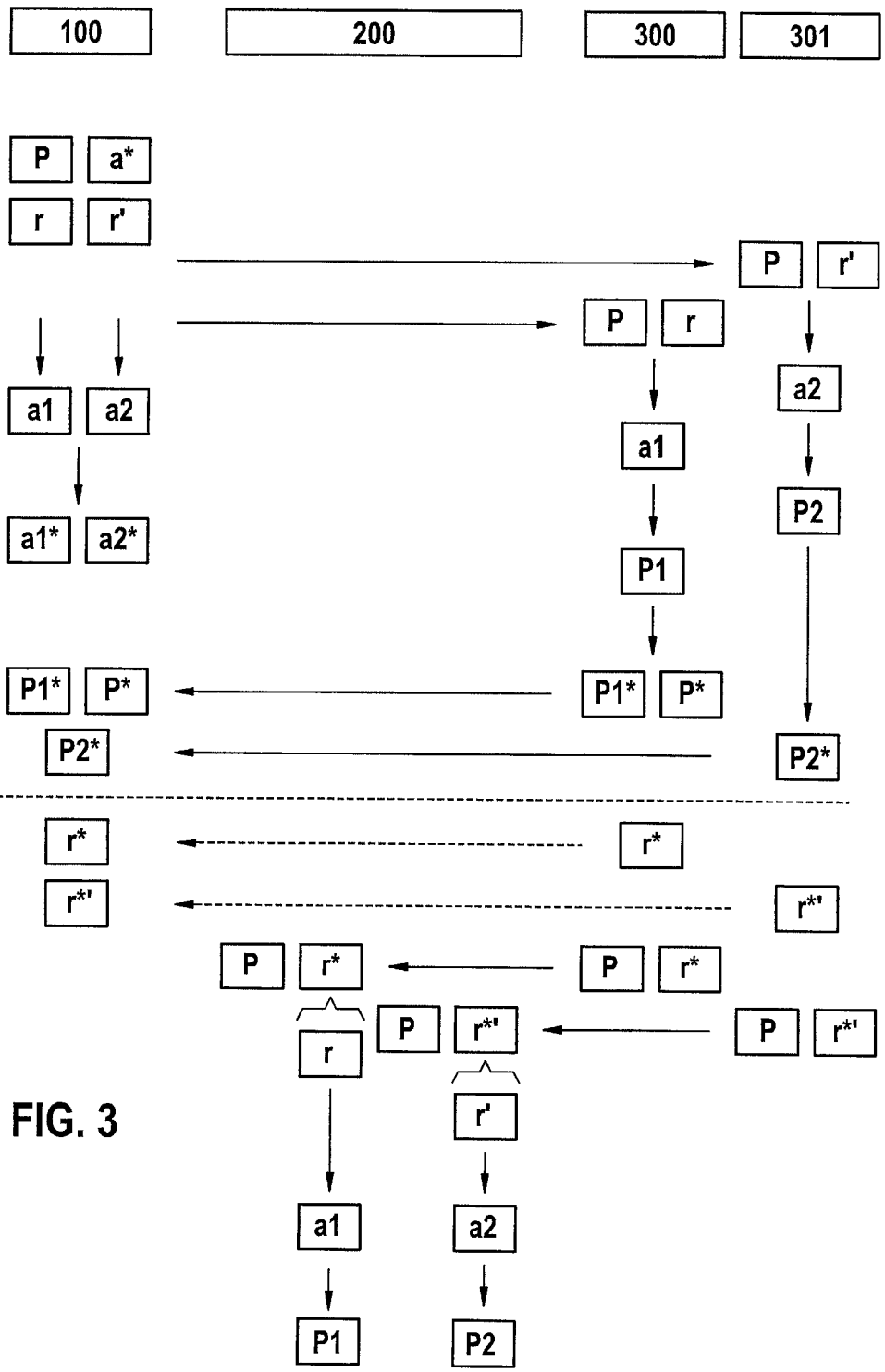
FIG. 3 schematically shows another preferred embodiment of a method according to the present invention.

FIG. 3 schematically shows another preferred embodiment of a method according to the present invention. The timing sequence is indicated from top to bottom. Involved in the method are one first subscriber 100, one second subscriber 200 and two intermediaries 300, 301.

The method corresponds essentially to the method shown in FIG. 1, but with the difference that first subscriber 100 generates two generator values r, r', from first key P only a part of the remaining keys, but together all the remaining keys, being calculated with each. In the present case, key P1 may be calculated with the aid of generator value r, and key P2 with the aid of generator value r'.

Generator value r is transmitted by first subscriber 100 to intermediary 300 and generator value r' is transmitted to intermediary 301, in each case together with first key P. Intermediary 300 then calculates key P1, intermediary 301 calculates key P2, and transmits it, in each case in an associated certificate P1* or P2*, to first subscriber 100. Certificate P* associated with the first key may be transmitted by one or also by the two intermediaries 300, 301 to first subscriber 100.

For the purpose of revoking the certificates, first key P and revocation value r* are then transmitted by intermediary 300 to second subscriber 200, which may correspond, in particular, to generator value r. Accordingly, intermediary 301 transmits a revocation value r*', which may correspond to generator value r', to second subscriber 200. In this way, it is possible to revoke all certificates. If intermediaries 300, 301 belong to the same certification authority, it is also conceivable that revocation values r* and r*' are suitably combined to form one revocation value, which may save on transmission expense.

The first subscriber is preferably also informed of the revocation, so that in the future it no longer uses the revoked certificates. This may also occur by transferring revocation values r*, r*', as is indicated in the figure by the dashed arrow.

Figure 4:
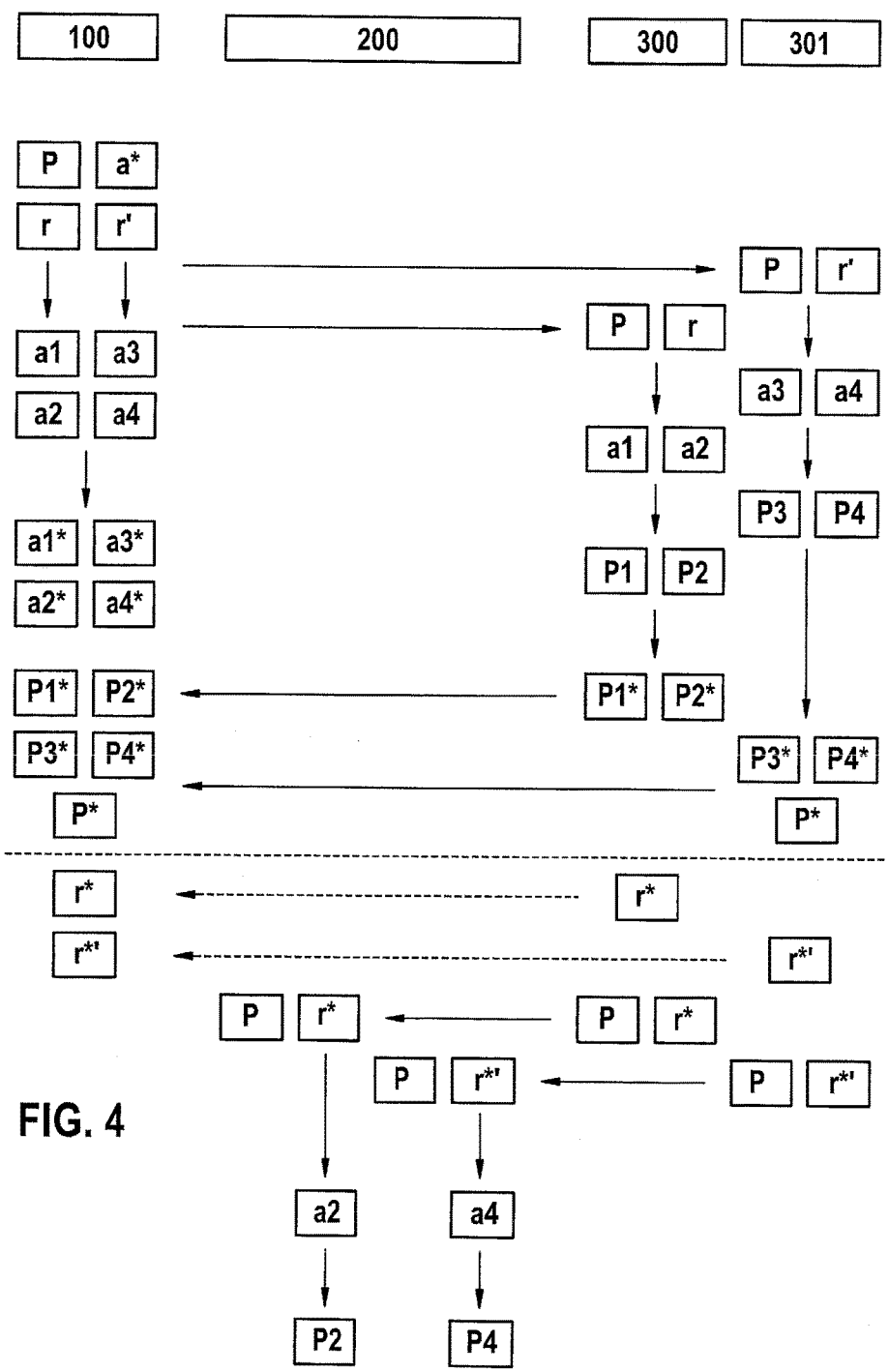
FIG. 4 schematically shows another preferred embodiment of a method according to the present invention.

FIG. 4 schematically shows another preferred embodiment of a method according to the present invention. The timing sequence is indicated from top to bottom. Involved in the method are one first subscriber 100, one second subscriber 200 and two intermediaries 300, 301.

The method corresponds essentially to the method shown in FIG. 1, but with the difference that it combines the two modifications shown in FIGS. 2 and 3.

As in the embodiment according to FIG. 3, two generator values r, r' are generated by first subscriber 100 and in each case transmitted, together with first key P, to intermediary 300, 301. In this case, keys P1, P2 may be calculated with the aid of generator value r, and keys P3, P4 may be calculated with the aid of generator value r'. The keys calculated by intermediaries 300, 301 are transmitted in each case as associated certificates to first subscriber 100.

For the purpose of revocation, intermediary 300 transmits first key P and revocation value r*, and intermediary 301 transmits first key P and revocation value r*' to second subscriber 200, with the aid of which, however, second subscriber 200 is able only to calculate keys P2, P4. Thus, second subscriber 200 is only able to mark keys P, P2, P4 as invalid, not, however, keys P1, P3.

In this manner, both advantages shown in the embodiments according to FIGS. 2 and 3 are combined. A potential retraceability is prevented, since the calculation of the remaining keys is divided among two intermediaries, and a potential subsequent retraceability is prevented, since keys already used are not transmitted to the second subscriber.

The first subscriber is preferably also informed of the revocation, so that in the future it no longer uses the revoked certificates. This may also occur by transferring the revocation values r*, r*', as is indicated in the figure by the dashed arrow.

As previously mentioned, a method according to the present invention is not limited to a second subscriber 200; rather, in reality, there exist normally a plurality of second subscribers such as, for example, other vehicles or traffic infrastructure. The same data are transmitted, in particular, at the same time to other second subscribers as they are to the one second subscriber.

The division into two intermediaries is also not limited. Depending on the degree of security, the calculation of the remaining keys may also be divided among even more intermediaries.

What is claimed is:

1. A method for revoking a group of a plurality of certificates, each of the certificates associated with a different respective key, for an authenticated communication between one first subscriber and at least one second subscriber, comprising:
revoking the plurality of certificates by transmitting to the at least one second subscriber a first key and a revocation value, the first key and the revocation value being different from one another, the first key being one of the different respective keys associated with one of the plurality of certificates; and
the second subscriber calculating, using both the first key and the revocation value, the remaining ones of the different respective keys, and identifying all of the plurality of certificates as invalid or revoked;
wherein each of the different respective keys is a public cryptographic key of a cryptographic key pair;
wherein the revocation value, for the purpose of information about the completed revocation, is transmitted to the first subscriber.

2. The method as recited in claim 1, wherein the first key is generated by the first subscriber.

3. The method as recited in claim 2, wherein an associated private key, together with the first key, is generated by the first subscriber.

4. The method as recited in claim 2, wherein the first key and the revocation value are transmitted by an intermediary to the at least one second subscriber.

5. The method as recited in claim 4, wherein the first key and a generator value, with the aid of which the keys of the group of certificates are calculated from the first key, are initially transmitted by the first subscriber to the intermediary.

6. The method as recited in claim 5, wherein the revocation value includes the generator value.

7. The method as recited in claim 4, wherein, for the purpose of revoking an additional group of certificates, the first key and one additional revocation value are transmitted by an additional intermediary to the at least one second subscriber.

8. The method as recited in claim 1, wherein the first key is a public cryptographic key of a cryptographic key pair.

9. A method for revoking a group of a plurality of certificates, each of the certificates associated with a different respective key, for an authenticated communication between one first subscriber and at least one second subscriber, comprising:
revoking the plurality of certificates by transmitting to the at least one second subscriber a first key and a revocation value, the first key and the revocation value being different from one another, the first key being one of the different respective keys associated with one of the plurality of certificates; and
the second subscriber calculating, using both the first key and the revocation value, the remaining ones of the different respective keys, and identifying all of the plurality of certificates as invalid or revoked;
wherein the first key is generated by the first subscriber;
wherein the first key and the revocation value are transmitted by an intermediary to the at least one second subscriber;
wherein the first key and a generator value, with the aid of which the keys of the group of certificates are calculated from the first key, are initially transmitted by the first subscriber to the intermediary; and
wherein the keys of the group of certificates for the authenticated communication are transmitted prior to revocation to the first subscriber in associated certificates signed by the intermediary.

10. A method for revoking a group of a plurality of certificates, each of the certificates associated with a different respective key, for an authenticated communication between one first subscriber and at least one second subscriber, comprising:
revoking the plurality of certificates by transmitting to the at least one second subscriber a first key and a revocation value, the first key and the revocation value being different from one another, the first key being one of the different respective keys associated with one of the plurality of certificates; and
the second subscriber calculating, using both the first key and the revocation value, the remaining ones of the different respective keys, and identifying all of the plurality of certificates as invalid or revoked;
wherein the first key is generated by the first subscriber;
wherein the first key and the revocation value are transmitted by an intermediary to the at least one second subscriber;
wherein the first key and a generator value, with the aid of which the keys of the group of certificates calculated from the first key, are initially transmitted by the first subscriber to the intermediary; and
wherein at least one additional key, which cannot be calculated with the aid of the revocation value, are calculated from the first key with the aid of the generator value.

11. A method for revoking a group of a plurality of certificates, each of the certificates associated with a different respective key, for an authenticated communication between one first subscriber and at least one second subscriber, comprising:
revoking the plurality of certificates by transmitting to the at least one second subscriber a first key and a revocation value, the first key and the revocation value being different from one another, the first key being one of the different respective keys associated with one of the plurality of certificates; and
the second subscriber calculating, using both the first key and the revocation value, the remaining ones of the different respective keys, and identifying all of the plurality of certificates as invalid or revoked;
wherein the first key is generated by the first subscriber;
wherein the first key and the revocation value are transmitted by an intermediary to the at least one second subscriber;
wherein, for the purpose of revoking an additional group of certificates, the first key and one additional revocation value are transmitted by an additional intermediary to the at least one second subscriber;
wherein the additional revocation value, for the purpose of information about the completed revocation, is transmitted by the additional intermediary to the first subscriber.

12. A method for revoking a group of a plurality of certificates, each of the certificates associated with a different respective key, for an authenticated communication between one first subscriber and at least one second subscriber, comprising:
revoking the plurality of certificates by transmitting to the at least one second subscriber a first key and a revocation value, the first key and the revocation value being different from one another, the first key being one of the different respective keys associated with one of the plurality of certificates; and
the second subscriber calculating, using both the first key and the revocation value, the remaining ones of the different respective keys, and identifying all of the plurality of certificates as invalid or revoked;
wherein the keys are generated with the aid of elliptic curve cryptography;
wherein each of the different respective keys is a public cryptographic key of a cryptographic key pair;
wherein the revocation value, for the purpose of information about the completed revocation, is transmitted to the first subscriber.

13. A processor unit, which is programmed to carry out, via a computer program stored on a non-transitory medium, a method for revoking a group of a plurality of certificates, each of the certificates associated with a different respective key, for an authenticated communication between one first subscriber and at least one second subscriber, the method comprising:
revoking the plurality of certificates by transmitting to the at least one second subscriber a first key and a revocation value, the first key and the revocation value being different from one another, the first key being one of the different respective keys associated with one of the plurality of certificates; and
wherein the second subscriber calculates, using both the first key and the revocation value, the remaining ones of the different respective keys, and identifies all of the plurality of certificates as invalid or revoked;
wherein each of the different respective keys is a public cryptographic key of a cryptographic key pair;
wherein the revocation value, for the purpose of information about the completed revocation, is transmitted to the first subscriber.

14. The processor unit as recited in claim 13, wherein the different keys are generated using elliptic curve cryptography.

15. The processor unit as recited in claim 13, wherein the first key is a public cryptographic key of a cryptographic key pair.

16. A computer program stored on a non-transitory medium, which prompts a processor unit to carry out a method for revoking a group of a plurality of certificates, each of the certificates associated with a different respective key, for an authenticated communication between one first subscriber and at least one second subscriber, the method comprising:
- revoking the plurality of certificates by transmitting to the at least one second subscriber a first key and a revocation value, the first key and the revocation value being different from one another, the first key being one of the different respective keys associated with one of the plurality of certificates; and
- wherein the second subscriber calculates, using both the first key and the revocation value, the remaining ones of the different respective keys, and identifies all of the plurality of certificates as invalid or revoked;
- wherein each of the different respective keys is a public cryptographic key of a cryptographic key pair;
- wherein the revocation value, for the purpose of information about the completed revocation, is transmitted to the first subscriber.

17. A non-transitory machine readable medium on which a computer program is stored, the computer program prompting a processor unit to carry out a method for revoking a group of a plurality of certificates, each of the certificates associated with a different respective key, for an authenticated communication between one first subscriber and at least one second subscriber, the method comprising:
- revoking the plurality of certificates by transmitting to the at least one second subscriber a first key and a revocation value, the first key and the revocation value being different from one another, the first key being one of the different respective keys associated with one of the plurality of certificates; and
- wherein the second subscriber calculates, using both the first key and the revocation value, the remaining ones of the different respective keys, and identifies all of the plurality of certificates as invalid or revoked;
- wherein each of the different respective keys is a public cryptographic key of a cryptographic key pair;
- wherein the revocation value, for the purpose of information about the completed revocation, is transmitted to the first subscriber.

18. A method for revoking a group of a plurality of certificates, each of the certificates associated with a different respective key, for an authenticated communication between a first subscriber and a second subscriber, the method comprising:
- determining a revocation value; and
- revoking the plurality of certificates by transmitting the revocation value and a first key to the second subscriber, the revocation value and the first key being different from one another, the first key being one of the different respective keys associated with one of the plurality of certificates;
- wherein the second subscriber is configured to calculate, using both the first key and the revocation value, the remaining ones of the different respective keys and identify all of the plurality of certificates as invalid or revoked;
- wherein each of the different respective keys is a public cryptographic key of a cryptographic key pair;
- wherein the revocation value, for the purpose of information about the completed revocation, is transmitted by the second subscriber to the first subscriber.

19. The method as recited in claim 18, wherein the different keys are generated using elliptic curve cryptography.

20. The method as recited in claim 18, wherein the first key is a public cryptographic key of a cryptographic key pair.

21. A method for revoking a group of a plurality of certificates, each of the certificates associated with a different respective key, for an authenticated communication between a first subscriber and a second subscriber, the method comprising:
- the second subscriber receiving a first key and a revocation value, the first key and the revocation value being different from one another, the first key being one of the different respective keys associated with one of the plurality of certificates;
- calculating, using both the first key and the revocation value, the remaining ones of the different respective keys; and
- identifying all of the plurality of certificates as invalid or revoked;
- wherein each of the different respective keys is a public cryptographic key of a cryptographic key pair;
- wherein the revocation value, for the purpose of information about the completed revocation, is transmitted to the first subscriber.

22. The method as recited in claim 21, wherein the different keys are generated using elliptic curve cryptography.

23. The method as recited in claim 21, wherein the first key is a public cryptographic key of a cryptographic key pair.

* * * * *